United States Patent [19]

Nalesnik

[11] Patent Number: 5,207,938
[45] Date of Patent: May 4, 1993

[54] METHOD FOR RETARDING DARKENING OF A DISPERSANT-ANTIOXIDANT OLEFIN COPOLYMER

[75] Inventor: Theodore E. Nalesnik, Wappingers Falls, N.Y.

[73] Assignee: Texaco Inc., White Plains, N.Y.

[21] Appl. No.: 688,800

[22] Filed: Apr. 22, 1991

[51] Int. Cl.$^5$ ................ C10M 149/10; C10M 151/02
[52] U.S. Cl. .................... 252/51.5 A; 252/50; 525/326.1; 528/493; 528/486
[58] Field of Search ............ 252/50, 51.5 A; 525/326.1; 528/493, 486

[56] References Cited

U.S. PATENT DOCUMENTS

| | | | |
|---|---|---|---|
| 3,203,943 | 8/1965 | Houser et al. | 528/493 |
| 3,218,304 | 11/1965 | Rottig et al. | 528/493 |
| 3,310,541 | 3/1967 | Breuers et al. | 528/493 |
| 3,368,975 | 2/1968 | Davis et al. | 252/51.5 |
| 3,798,166 | 3/1974 | Braid | 252/51.5 A |
| 4,816,172 | 3/1989 | Kapuscinski et al. | 252/51 |
| 4,863,623 | 9/1989 | Nalesnik | 252/51.5 A |

*Primary Examiner*—Prince Willis, Jr.
*Assistant Examiner*—J. Silbermann
*Attorney, Agent, or Firm*—James J. O'Loughlin; Vincent A. Mallare

[57] ABSTRACT

A method of retarding the darkening effect of a unreacted, excess antioxidant amine in a DAOCP comprising:

(a) reacting an organic compound with a finished DAOCP containing an unreacted excess antioxidant amine to form therewith an adduct product; and (b) recovering the DAOCP containing the formed adduct product, whereby the darkening of the DAOCP is retarded.

6 Claims, No Drawings

METHOD FOR RETARDING DARKENING OF A DISPERSANT-ANTIOXIDANT OLEFIN COPOLYMER

BACKGROUND OF THE INVENTION

This invention relates to viscosity index improvers (VII's) utilized in producing a dispersant-antioxidant olefin copolymer (DAOCP), and more particularly to a method of retarding the darkening of a DAOCP.

In producing DAOCP(s) VI improvers, a reactive polymer intermediate is used such as grafted maleic anhydride on an olefin copolymer (OCP) and involves derivatizing the polymer bound maleic anhydride further with an excess of an analine or amine bearing hindered amine antioxidant such as N-phenyl phenylene diamine. This entire manufacturing process is generally conducted under an inert nitrogen atmosphere. The product is then stored at 170° F. under a nitrogen atmosphere.

A problem sometimes encountered with this DAOCP VI improver is color darkening when stored at elevated temperatures in the presence of air or oxygen. This is cosmetically unacceptable to some customers though it is not deleterious to it's performance. This darkening is due to oxidation and dimerization of the unreacted excess amine, as in the case of N-Phenyl phenylenediamine, through the primary amine functionality to form a deep blackish blue highly chromophoric material.

Thus, it is an object of the present invention to provide a means of retarding the darkening of a finished DAOCP VI Improver (VII).

DISCLOSURE STATEMENT

U.S. Pat. No. 4,863,623 discloses an additive composition comprising a graft and amine-derivatized copolymer prepared from ethylene and at least one ($C_3$–$C_{10}$) alpha-monoolefin and, optionally, a polyene selected from non-conjugated dienes and trienes comprising from about 15 to 80 mole percent of ethylene, from about 20 to 85 mole percent of said ($C_3$–$C_{10}$) alpha-monoolefin and from about 0 to 15 mole percent of said polyene having a average molecular weight ranging from about 5000 to 500,000 which has been reacted with at least one olefinic carboxylic acid acylating agent to form one or more acylating reaction intermediates characterized by having a carboxylic acid acylating function within their structure and reacting said reaction intermediate with an amino-aromatic polyamine compound from the group consisting of an N-arylphenylenediamine, an aminothiazole, an aminocarbazole, an aminoindole, an amino- pyrrole, an amino-indazolinone, an aminomercaptotriazole, and an aminoperimidine to form said graft and amine-derivatized copolymer, and a lubricating oil composition containing same are provided.

U.S. Pat. No. 4,919,683 discloses a stable middle distillate fuel-oil composition which comprises (a) a major portion of a middle distillate fuel oil; and (b) a minor amount, as a storage stabilizing additive, of N(4-anilinophenyl) succinimide of a copolymer and maleic anhydride graft.

U.S. patent application, Ser. No. 07/345,265 discloses an additive composition comprising a graft and amine-derivatized polymer having an average molecular weight ranging from about 300 to 3500 which has been reacted with at least one olefinic carboxylic acid acylating agent to form one or more acylating reaction intermediates characterized by having a carboxylic acid acylating function within their structure and reacting said reaction intermediate with an amino-aromatic polyamine compound from the group consisting of an N-arylphenylenediamine, an aminothiazole, an aminocarbazole, an amino-indazolinone, an aminomercaptotriazole and an aminoperimidine to form said graft and amine-derivatized copolymer, and a lubricating oil composition containing same are provided.

SUMMARY OF THE INVENTION

This invention provides a method of retarding the darkening effect of a unreacted, excess antioxidant amine in a DAOCP comprising:

(a) reacting a low molecular weight organic compound selected from the group consisting of an aldehyde, a ketone, an acid and an acid anhydride with a finished DAOCP containing an unreacted excess antioxidant amine to form therewith, respectively, a corresponding adduct product represented, respectively, by the following formulas

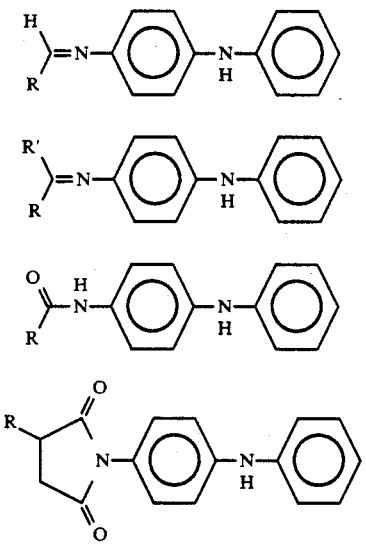

wherein, although R'≠ or =R, both R and R' each are H or a ($C_1$–$C_{30}$) alkyl, a ($C_6$–$C_{30}$) alkenyl or a ($C_7$–$C_{30}$) alkylaryl group; and (b) recovering the DAOCP containing the formed adduct product, whereby the darkening of the DAOCP is retarded.

DETAILED DESCRIPTION OF THE INVENTION

In the storage of produced (finished) DAOCP's, the problem of discoloring or darkening of such DAOCP's containing unreacted excess amine antioxidants is at least retarded by the process and means of the present invention.

According to the present invention the darkening effect of excess or unreacted amine antioxidants in a finished (stored) DAOCP is retarded by post-reacting the finished DAOCP with a variety of compounds that are reactive toward forming an adduct product with the primary aromatic amine as in this case unreacted free N-Phenyl phenylenediamine. These compounds maybe low molecular weight organic acids, acid anhydrides, ketones and aldehydes. By forming these adduct products with the primary amine of the antioxidant, the amine antioxidant is prevented from dimerizing or trimerizing in the presence of oxygen to form the highly darkened color side products. These compounds can be described in general terms by the formulas shown below.

For the ketones, aldehydes and acids of the present invention, the formula may be:

and for acid anhydrides the formula may be

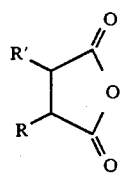

where X is R, R', H or OH; and although R'≠ or =R, both R and R' each are H or a ($C_1$–$C_{30}$) alkyl, a ($C_6$–$C_{30}$) alkenyl or a ($C_7$–$C_{30}$) alkylaryl group.

According to the present invention and method, the ketone, aldehyde acid and acid anhydride are represented, respectively, by the following formulas

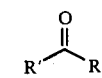

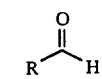

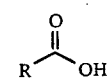

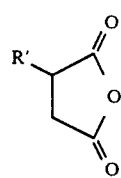

wherein, although R'≠ or =R, both R and R' each are H or a ($C_1$–$C_{30}$) alkyl, a ($C_6$–$C_{30}$) an alkenyl or a ($C_7$–$C_{30}$) alkylaryl group.

The unreacted, excess antioxidant amine may be N-Aryl phynylenediamine and isomers (ortho and para) as represented by the formulas

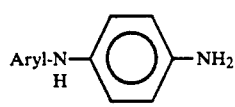

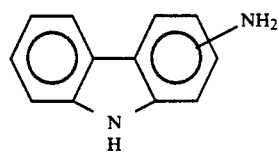

By the following equations, there is shown respectively, the reactions of an aldehyde, a ketone, an acid and an acid anhydride with a unreacted excess N-Phenyl phenylenediamine to form, respectively, a corresponding adduct product:

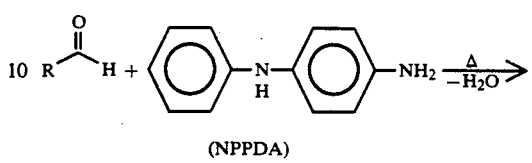

(NPPDA)

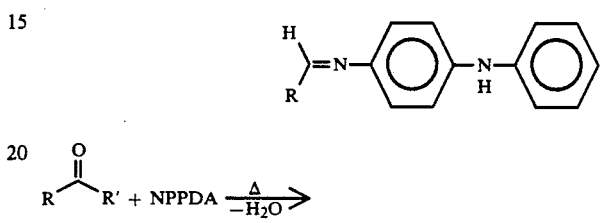

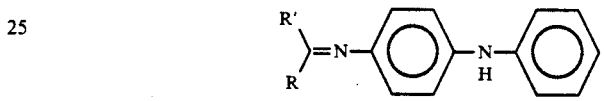

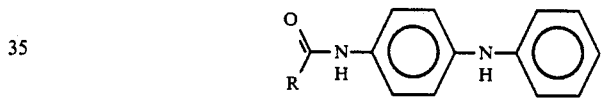

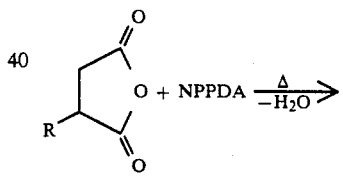

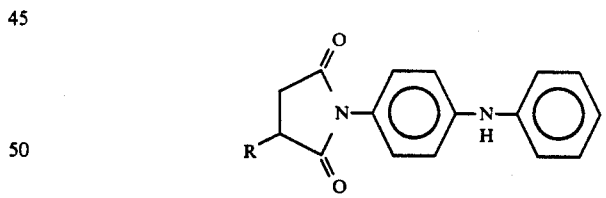

wherein, although R'≠ or =R, both R and R' each are H or a ($C_1$–$C_{30}$) alkyl, a ($C_6$–$C_{30}$) an alkenyl or a ($C_7$–$C_{30}$) alkylaryl group.

In order to show the effectiveness and to clearly show the advantages of the present invention, the following Examples are provided along with the results in Table I. In the Examples, a maleic anhydride olefin copolymer (MAOCP) is used. Also, in the Examples and Table I, the terms "H-50" and "H-300" represent polyisobutylenes (PIBs) manufactured and sold by AMOCO Chemical Company of Naperville Ill.; and the term (Surfonic N-40) is a nonionic solvent manufactured and sold by Texaco Chemical Company of Houston, Tex.

EXAMPLE I

Multifunctional VI Improver Without Color Retardant

| Materials | Amounts |
|---|---|
| MAOCP (1.0 wt % MA) | 36 gms (3.67 × $10^{-3}$ mole MA) |
| SNO-100 base oil | 246 gms. |
| N-phenyl phenylenediamine | 1.1 gms. (5.9 × $10^{-3}$ moles) |
| Surfonic N-40 | 5 gms. |

Procedure

1. Place MAOCP rubber, cut into $\frac{1}{8}$" cubic pieces, and base oil in a 500 ml flask equipped with a mechanical stirrer and thermometer under a nitrogen atmosphere for 1.5 hours.
2. Dissolve rubber in oil by raising the temperature to 160° F. with stirring under nitrogen atmosphere for 1.5 hours.
3. Add to the rubber oil solution, 1.1 gms of N-Phenyl phenylenediamine pre-dissolved in 5 gms of Surfonic N-40. React under nitrogen at 160° C. for a additional 3 hours.
4. Cool to 80° C. and filter through a 160 mesh stainless steel screen.

EXAMPLE II

Multifunctional VI Improver With Color Retardant:Dodecylaldehyde

| Materials | Amount |
|---|---|
| MAOCP (1.0 wt % MA) | 36 gms (3.67 × $10^{-3}$ mole MA) |
| SNO-100 base oil | 246 gms. |
| N-phenyl phenylenediamine | 1.1 gms. (5.9 × $10^{-3}$ moles) |
| Surfonic N-40 | 5 gms. |
| Dodecylaldehyde | 0.55 gms. (3.0 × $10^{-3}$ moles) |

Procedure

1. Place MACOP rubber, cut into $\frac{1}{8}$" cubic pieces, and base oil in a 500 ml flask equipped with a mechanical stirrer, thermometer and a nitrogen inlet/outlet to provide an inert atmosphere.
2. Dissolve rubber in the oil by raising the temperature to 160° C. with stirring under a nitrogen atmosphere for 1.5 hours.
3. Add to the rubber oil solution, 1.1 gms of N-Phenyl phenylenediamine pre-dissolved in Surfonic N-40. React under nitrogen at 160° C. for an additional 3 hours.
4. After the 3 hour imidization reaction period, add the dodecylaldehyde and react for another 1.5 hours at 160° C.
5. Cool to 80° C. and screen filter (100 mesh).

EXAMPLE III

Color Retardant: Furaldehyde

Materials/Procedure: Same as Example II, except substitute 0.24 gms of furaldehyde for dodecylaldehyde.

EXAMPLES IV and V

Color Retardant: Diisobutylketone

Materials/Procedures: Same as Example II except substitute 0.22 gms. of diisobutylketone (Example IV) and 0.31 gms of diisobutylketone (Example V) for dodecylaldehyde.

EXAMPLE VI

Color Retardant: 2-Octanone

Materials/Procedure: Same as Example II except substitute 0.40 gms of 20 octanone for dodecylaldehyde.

EXAMPLES VII and VIII

Color Retardant: H-50 Polyisobutenyl Succinic Anhydride (Effective Mw=720)

Materials/Procedure: Same as Example II except substitute 1.1 gms of H-50 polyisobutenyl anhydride (Example VII) and 2.0 gms. of H-50 polyisobutenyl succinic anhydride (Example VIII) for dodecylaldehyde.

EXAMPLE IX

Color Retardant: H-300 Polyisobutenyl Succinic Anhydride (Effective Mw=2400)

Materials/Procedure: Same as Example II except substitute 5.25 gms of H-300 polyisobutenyl succinic anhydride for dodecylaldehyde.

The Color Storage Stability Test utilized according to the present invention is described below.

COLOR STORAGE STABILITY TEST

The test for evaluating the effectiveness of these color retardant is described as follows:

1. The VI improver containing the color retardant is blended as a 5 wt.% solution in SNO-100 for 15 minutes at 125° F.
2. This blend is then placed in a 4 oz. bottle three quarter filled and capped.
3. This bottled sample is then placed in an oven and stored for 30 days at 80° C.
4. After 30 days at 80° C., the sample is removed and allowed to cool to room temperature.
5. The sample is then evaluated for color shade.

The test for evaluating the color shade of the VI improver oil solution used according to the present invention, is provided below.

COLOR SHADE TEST

The test method used for evaluating color shade for the test samples stored at 80° C. for 30 days is the D 1500-87 ASTM Color test. This test method involves using a standard light source, where by a liquid sample is placed in the test container and compared with colored glass disks ranging in values from 0.5 to 8.0. When an exact match is not found and the sample color falls between two standard colors, the higher of the two colors is reported.

The effectiveness of the retardants of the present invention is shown in the results recorded below in Table I.

The results shown below in Table I clearly show the improvement in color stability for all the experimental color retardants added after the multifunctional VI improver (VII) preparation as compared to the VI improver (VII) without any color retardant (Example I). It is also shown that the most effective color retardants were dodecylaldehyde, 2-octanone and H-300 PIBSA.

TABLE I

| | ASTM COLOR AFTER 30 DAY STORAGE AT 80° C. | | |
|---|---|---|---|
| Example | Color Stabilizer, | Equiv.[1] | Color (off shade) 0.5 min - 8.0 max[2] |
| I | None | | <7.5 |
| II | dodecylaldehyde, | 1.3 | <1.5 |
| III | Furaldehyde, | 1.1 | <5.0 |
| IV | Diisobutylketone, | 0.7 | <6.5 |
| V | Diisobutylketone, | 0.98 | <6.0 |
| VI | 2-Octanone | 1.4 | <3.0 |
| VII | H-50 PIBSA[3], | 0.7 | <5.5 |
| VIII | H-50 PIBSA[3], | 1.25 | <5.0 |
| IX | H-300 PIBSA[3], | 0.98 | <3.0 |

[1]Molar equivalents to excess NPPDA
[2]The lower the value the lighter the color.
[3]Polyisobutenyl succinic anhydride.

WE CLAIM:

1. A method of retarding the darkening effect of a unreacted, excess antioxidant amine in a Dispersant-Antioxidant olefin copolymer comprising:
   a) reacting a low molecular weight organic compound selected from the group consisting of an aldehyde, a ketone, an acid and an acid anhydride, with a finished Dispersant-Antioxidant olefin copolymer containing an unreacted excess antioxidant amine to form therewith, respectively, a corresponding adduct represented, respectively, by the following formulas:

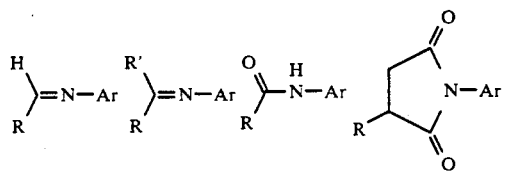

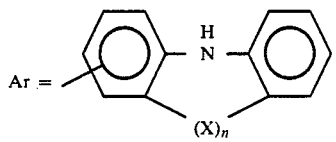

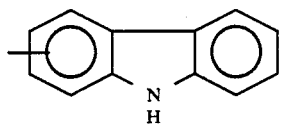

wherein n=0 or 1 and when n=1, then X=CH$_2$, O, S or NH, and although R' ≠ or = R, both R and R' each are H or a (C$_1$-C$_{30}$) alkyl, a (C$_6$-C$_{30}$) alkenyl or a (C$_7$-C$_{30}$) alkylaryl group; and
   b) recovering said Dispersant-Antioxidant olefin copolymer containing said formed adduct, product, whereby the darkening of said Dispersant-Antioxidant olefin copolymer is retarded.

2. The method of claim 1, wherein said ketone, aldehyde, acid

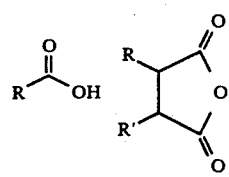

where, although R' ≠ or = R, both R and R' each are H or a (C$_1$-C$_{30}$) alkyl, a (C$_6$-C$_{30}$) alkenyl or a (C$_7$-C$_{30}$) alkylaryl group.

3. The method of claim 1, wherein said aldehyde, ketone and acid are represented by the formula

and said acid anhydride is represented by the formula

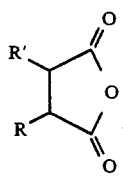

where X is R, R', H or OH; and although R' ≠ R or = R, both R and R' each are H or a (C$_1$-C$_{30}$) alkyl, a (C$_6$-C$_{30}$) alkenyl or a (C$_7$-C$_{30}$) alkylaryl group.

4. The method of claim 1, wherein said aldehyde is dodecylaldehyde.

5. The method of claim 1, wherein said ketone is 2-octanone.

6. The method of claim 1, wherein said acid anhydride is polyisobutylene succinic anhydride.

* * * * *